(12) United States Patent
Sherwin

(10) Patent No.: US 6,702,482 B2
(45) Date of Patent: Mar. 9, 2004

(54) TRIPOD

(75) Inventor: Daniel Sherwin, Jerusalem (IL)

(73) Assignee: Nitzan Kimichi and Dror Tishler, Jerusalem (IL); part interest ( * ) Notice: Subject to any disclaimer, the term of this patent is extended or adjusted under 35 U.S.C. 154(b) by 0 days.

(21) Appl. No.: 09/766,573

(22) Filed: Jan. 23, 2001

(65) Prior Publication Data

US 2001/0010764 A1 Aug. 2, 2001

(30) Foreign Application Priority Data

Jan. 30, 2000 (IL) .................................................. 134285

(51) Int. Cl.$^7$ ......................... G03B 17/00; F16M 11/38; F16M 11/26
(52) U.S. Cl. ...................... 396/428; 248/168; 248/188.5
(58) Field of Search ................................ 396/419, 428; 248/123.11, 187.1, 177.1, 178.1, 183.1, 183.2, 168, 163.1, 188.2, 188.3, 188.5, 411, 407, 408, 117.4, 124.2, 154

(56) References Cited

U.S. PATENT DOCUMENTS

| | | | | |
|---|---|---|---|---|
| 766,175 A | * | 7/1904 | Gerts | 248/177.1 |
| 3,589,757 A | * | 6/1971 | Mooney | 403/105 |
| 4,185,936 A | * | 1/1980 | Takahashi | 403/104 |
| 4,767,090 A | * | 8/1988 | Hartman et al. | 248/168 |
| 4,872,627 A | | 10/1989 | O'Connor | 248/168 |
| 5,320,316 A | | 6/1994 | Baker | 248/163.1 |
| 5,492,430 A | * | 2/1996 | Jones | 403/109.5 |
| 5,503,357 A | * | 4/1996 | Johnson et al. | 248/188.5 |
| 5,570,968 A | * | 11/1996 | Sassmannshausen et al. | 403/109.3 |

OTHER PUBLICATIONS

Catalog, Manfrotto Professional Camera Supports, 07/99, Lit. #53 (28 pages).
Catalog, 540 Art Carbon Pro Video Tripod, Manfrotto Nord, Issue No. 1, 09/01 (6 pages).
Camera Support ENG—Speed Lock—100mm Tripods (Carbon fibre) Dec. 21, 2001 (2 pages) at "http://www.sachtler.de/seiten/products/cam_supp_eng/speedlock.htm".
Brochure, Speed Lock CF, Sachtler Support & Lighting, 09–99 (2 pages).
Catalog, OConnor Professional Camera Support Systems, undated (12 pages).
Consumer Price List, OConnor Professional Camera Support Systems, effective Feb. 1, 1997 (16 pages).

* cited by examiner

Primary Examiner—Russell Adams
Assistant Examiner—Rochelle Blackman
(74) Attorney, Agent, or Firm—Baker Botts L.L.P.

(57) ABSTRACT

The invention provides a fast-deployable light-weight tripod, comprising a center support for supporting a load, provided with three peripheral hinge members, three multi-stage telescoping leg assemblies each attached to one of the hinge members, each leg assembly comprising at least two compression-resistant members interconnected by a telescopic joint, at least one cam locking unit associated with each telescopic joint, each locking unit having a first engaged position preventing relative axial movement which would shorten the length of the leg assembly, and a second disengaged position wherein the assemblies are free to move in either axial direction, each locking unit being urged towards its engaged position for automatic locking of the tripod in its deployed position with the cam locking being effected by pressure on the cam unit from its associated extended leg; and further comprising a hand accessible release element for each leg assembly for independently releasing the at least one cam locking unit associated therewith, thereby enabling the shortening of the length of the assembly.

11 Claims, 3 Drawing Sheets

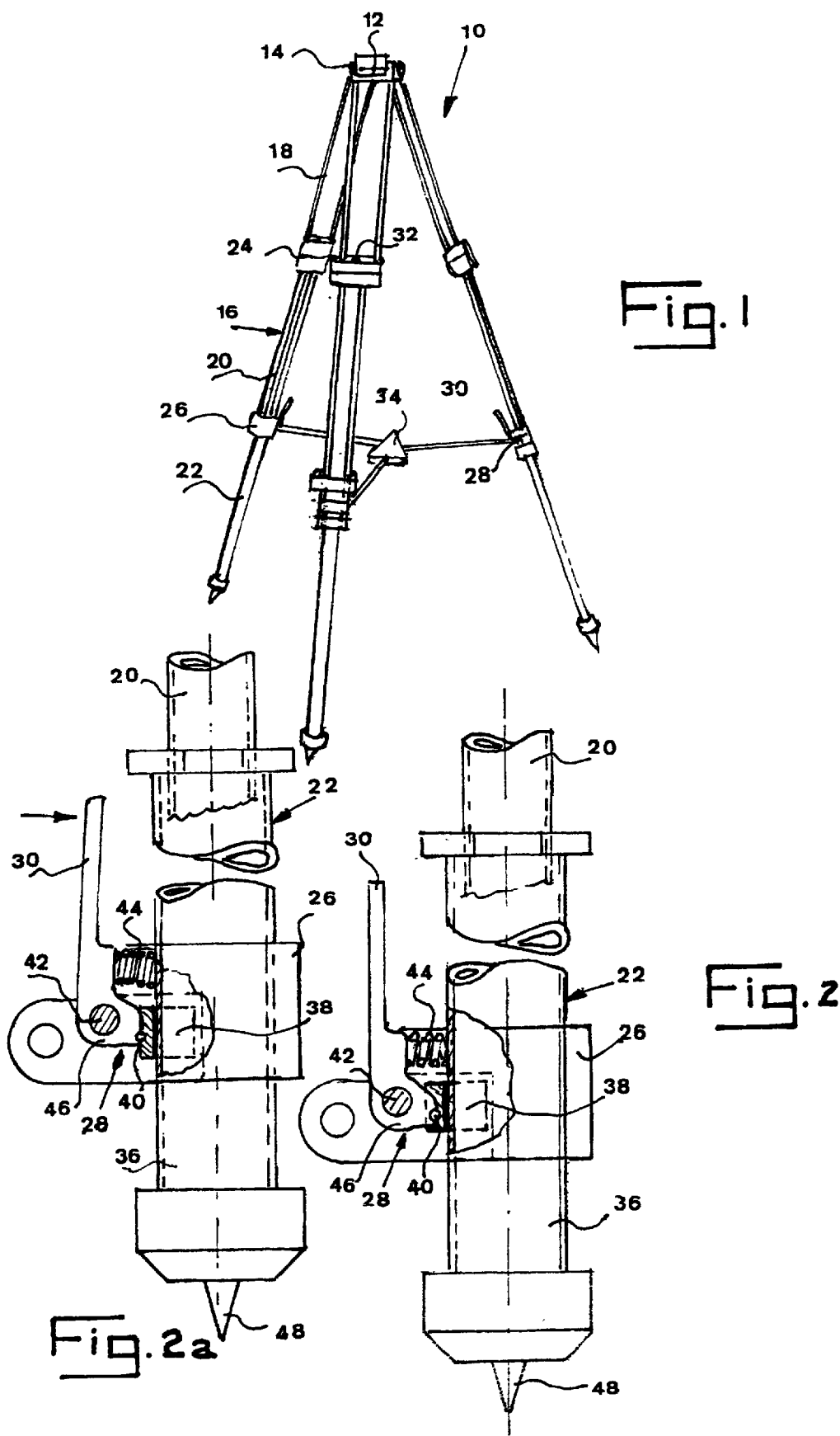

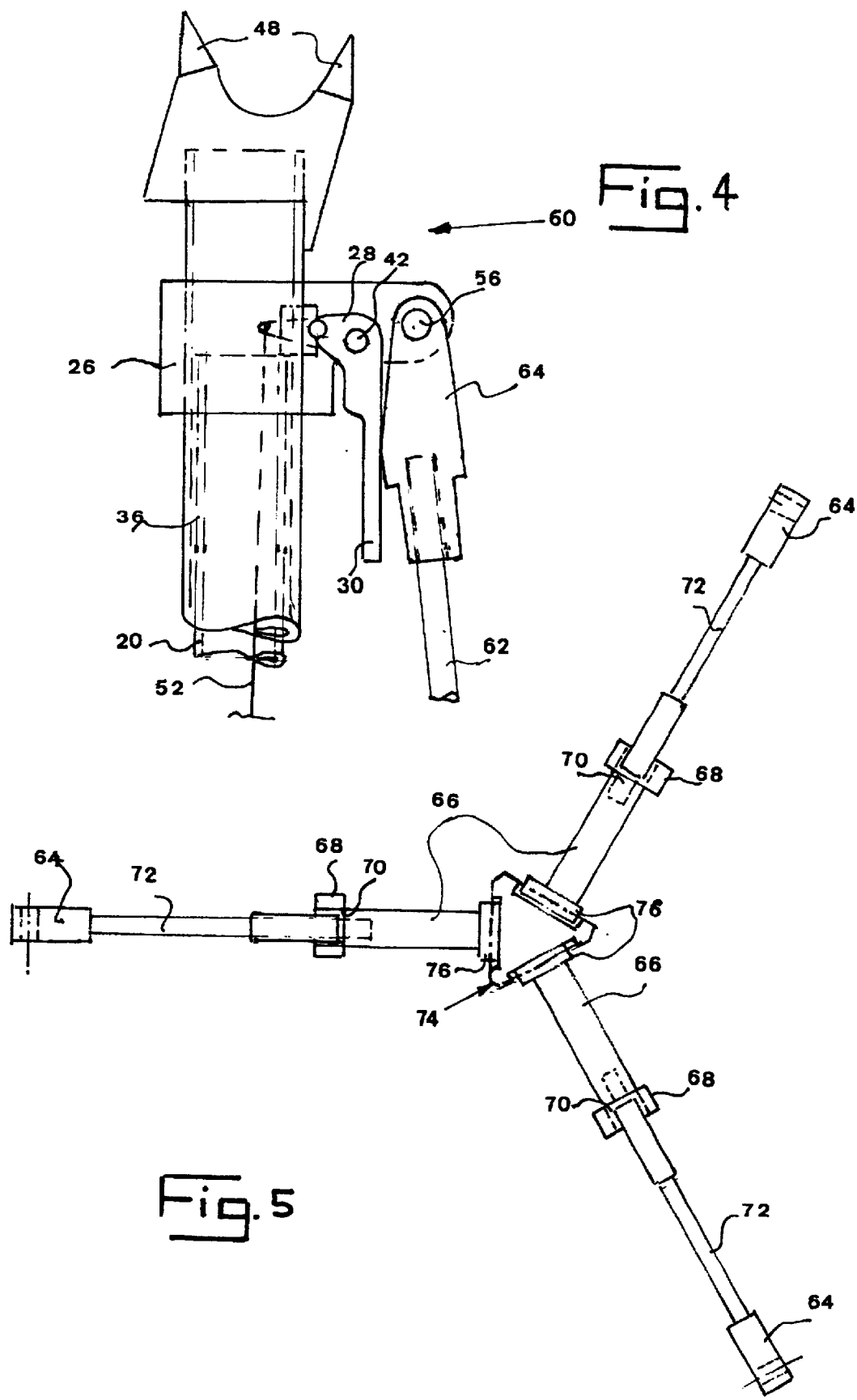

TRIPOD

The present invention relates to a tripod, typically used for supporting an optical instrument such as a camera. More particularly, the invention provides a tripod which conforms to the requirements of mobile users needing fast and secure set-up and after use, fast folding into a compact, low-weight package.

Tripods are used to provide a temporarily-fixed support for surveying instruments; still and TV and cinematography cameras; lighting fixtures, reflectors, security equipment and medical and laboratory equipment. Cameras such as are used by television crews can be of considerable weight, yet need to be supported steadily to provide best results. A tripod, provided with individually adjustable legs offers such support even when set up on an uneven or stepped surface. News reporters, for newspapers, magazines or TV are typical users of a tripod, but their needs are not well served by prior art devices. Many leg adjustment mechanisms rely on turning lock screws during set-up and releasing same after filming. Failure to securely lock one of the legs causes tripod collapse and likely damage to a costly camera, yet the task is particularly difficult in cold weather. Applying too much torque to a lock-screw can damage the screw thread or the leg member with which the screw is in contact. Most locking devices prevent movement in both axial directions, and so inhibit extension of a leg without prior lock release. As three legs require locking/unlocking, such devices require too much time to set-up and dismantle, and for news camera personnel the person or event to be photographed may be unavailable by the time the camera is properly supported for operation.

The tripod is by its nature a mobile item which is carried by its users, wherefore light weight is a self-evident requirement. Yet some commercially-available tripods, using aluminium tubes as leg members, weigh between 5 and 10 kg.

In U.S. Pat. No. 5,320,316 Baker discloses a tripod, the claimed innovation concerning primarily the leg structure. The proposed locking device is a ring floatingly supported in a groove. The inner edges of the ring lock against the outer surface of the leg tube. The present inventor considers this form of lock to be usable only against a metal leg tube, as it would damage a plastic tube. Consequently a tripod made accordingly will have an undesirably high weight.

Johnson et al in U.S. Pat. No. 5,503,357 specify threaded holes and screws for locking a tripod. When locked, the legs can not be extended outwards. One of the disadvantages of lock-screws is that unless tightened with considerable force, inadvertent leg retraction can occur under a heavy load. Commercial catalogue LNORD 99, G issued by Lino Manfrotto & Co. (Italy) lists a wide range of tripods. The manufacturer uses aluminium tubes for construction of legs for the more heavy duty tripods. This results in high weight. Tripods intended to support 20 kg weigh between 3.6 to 7.9 kg. The only model (132X) able to support 30 kg weighs 6.9 kg. Telescopic joints are individually locked by threaded lock screws.

OCONNOR (Costa Mesa, USA) has issued a 1999 commercial catalogue featuring a range of tripods having carbon fiber legs. Maximum allowed load is between 27 and 91 kg, depending on the model, and corresponding weights of the tripod are between 4.2 and 10.8 kg. A lever-operated ring under the top casting releases all 3 legs simultaneously. The legs are individually adjustable by means of lock levers. However the user is required to push down the leg lock levers to lock the joints, as locking is not automatic.

The Sachtler company (www.sachtler.de/seiten/whatsup/new-speedlock.htm) has recently disclosed a tripod (model HD) having carbon fiber legs and provided with a locking device which controls an upper and a lower telescopic joint simultaneously. Users must release all three clamps to extend legs. Threaded lock screws are used on the spreader arms. The tripod weight of 3 kg is stated, but no maximum extended height is given.

It is therefore one of the objects of the present invention to obviate the disadvantages of prior art tripods and their associated locking devices and to provide a tripod which can be deployed and folded without the user having to operate any locking device.

It is a further object of the present invention to provide a locking device which is faster to operate than a lock screw.

A further object is to provide a tripod which has a low self-weight relative to its extended height and the weight of the supported load.

Yet a further object of the present invention is to provide a tripod wherein the force of leg locking automatically adjusts itself in accordance with the load being supported, and totally eliminates the risk of inadvertent omission to lock any or all legs.

The present invention achieves the above objects by providing a fast-deployable light-weight tripod, comprising:
  a) a center support for supporting a load, provided with three peripheral hinge members;
  b) three multi-stage telescoping leg assemblies each attached to one of said hinge members, each leg assembly comprising at least two compression-resistant members interconnected by a telescopic joint;
  c) at least one cam locking unit associated with each telescopic joint, each locking unit having a first engaged position preventing relative axial movement which would shorten the length of said leg assembly, and a second disengaged position wherein said assemblies are free to move in either axial direction, each locking unit being urged towards its engaged position for automatic locking of said tripod in its deployed position with said cam locking being effected by pressure on said cam unit from its associated extended leg; and further comprising:
  d) a hand accessible release element for each leg assembly for independently releasing said at least one cam locking unit associated therewith, thereby enabling the shortening of the length of said assembly.

In preferred embodiments of the present invention, said tripod further comprises a foldable hinged three-arm restriction member hingedly attached to said legs to prevent excessive spread of said leg assemblies.

In a preferred embodiment of the present invention there is provided a tripod wherein actuation of a hand-accessible element disengaging a cam locking unit associated with a lower telescopic joint is connected to a linkage arranged to simultaneously disengage at least one cam locking unit controlling an upper telescopic joint.

In especially preferred embodiments of the present invention, said tripod comprises three compression resistant members interconnected by an upper and a lower telescopic joint and further comprises at least one cam locking unit associated with each telescopic joint, each locking unit having a first engaged position preventing relative axial movement which would shorten the length of said leg assembly, and a second disengaged position wherein said assemblies are free to move in either axial direction, and wherein said cam locking unit allows extension of its associated leg assembly while in its engaged position and wherein said hand-accessible release element arranged to disengage said lower telescopic joint is connected to a linkage arranged to simultaneously disengage at least one cam locking unit controlling said upper telescopic joint.

In a most preferred embodiment of the present invention there is provided a tripod wherein the hinged three-arm restriction member, is when folded, positioned to press against all three release levers, thus disengaging cam locking units on all legs at both telescopic joints, whereby the tripod can be folded and retracted very quickly without the need for separate manual release of any of the locking devices, although it is possible in smaller embodiments of the present invention, which do not include the restriction member, to arrange the release levers so that when the three legs are brought together, the release levers interact with each other, disengaging the cam locking units on all the legs to enable the rapid retraction and telescoping compaction thereof.

Yet further embodiments of the invention will be described hereinafter.

It will thus be realized that the novel light-weight tripod of the present invention meets the requirements of fast set up, allows individual leg extension, safely supports any load within its range and yet avoids possible damage due to excessively hard manual locking. In particular, folding of the tripod is faster than any prior-art device as no locking device whatsoever need be operated manually for this purpose.

In the drawings:

FIG. 1 is a non-detailed perspective view of a preferred embodiment of the tripod, shown almost fully extended, according to the invention;

FIG. 2 is an elevational, partially sectioned view of the lower telescopic joint and its cam locking unit in its engaged position;

FIG. 2a is a detail view of the same unit disengaged;

FIG. 4 is an upside-down elevational view showing automatic release of all lock units as result of folding the three arm restriction member; and FIG. 5 is a plan view of an extendible three-arm restriction member.

Figure 3:
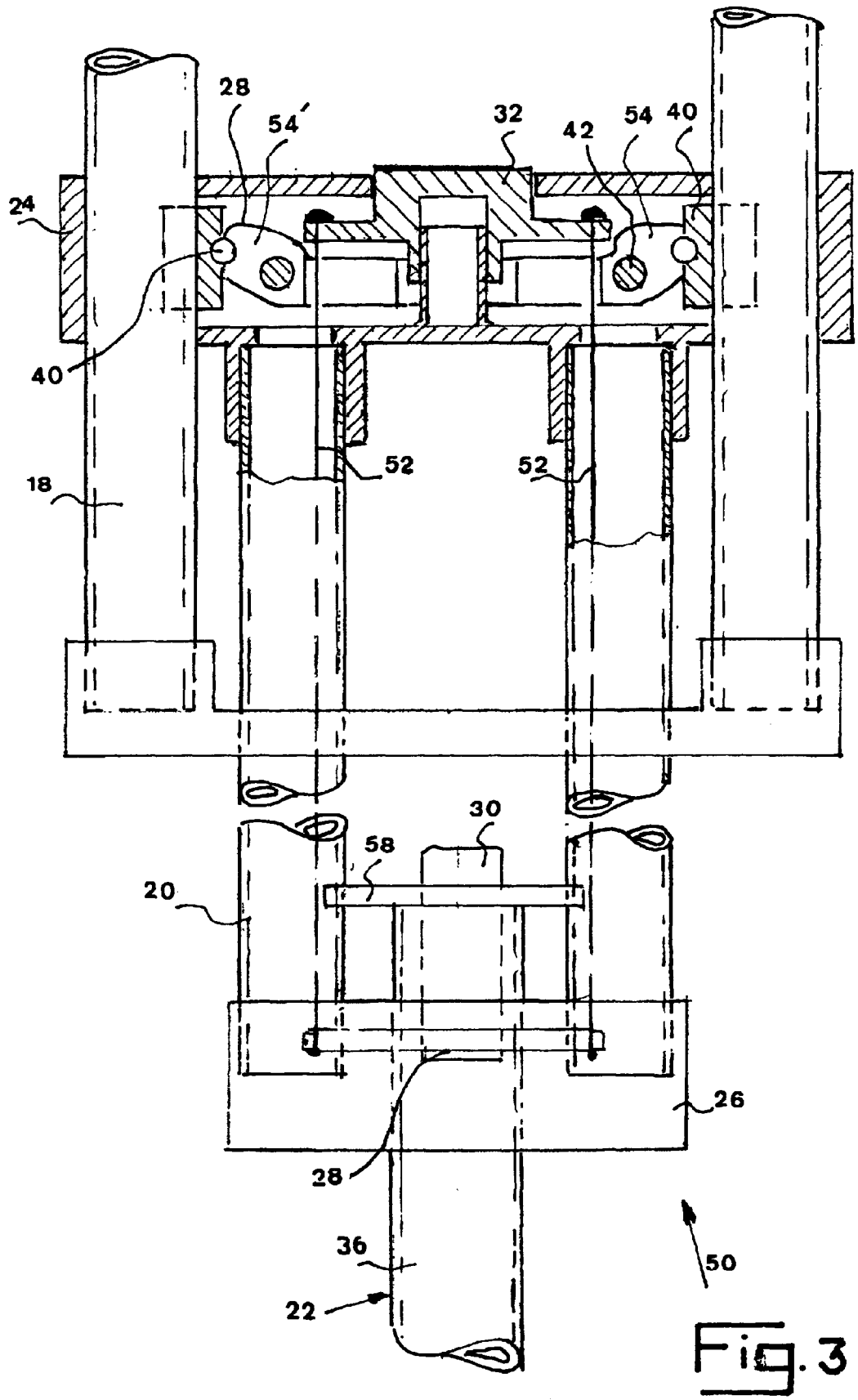
FIG. 3 is an elevational view of a part of a leg assembly, wherein disengagement of the lower joint lock also releases two lock units on the upper joint.

There is seen in FIG. 1 a fast-deployable light-weight tripod 10. A center support 12 is configured to support a load, typically a camera not shown, and is provided with three peripheral hinge members 14.

Three multi-stage telescoping leg assemblies 16 are each attached to one of the hinge members 14. Each leg assembly 16 comprises three compression-resistant members 18, 20, 22 interconnected by an upper 24 and a lower 26 telescopic joint, both joints 24, 26 being seen more clearly in FIG. 3. Preferably each pressure-resistant member 18, 20, 22 comprises at least one plastic, fiber-reinforced tube. Advantageously the fiber-reinforced tube is reinforced with carbon fibers.

The tube can be produced by filament winding which results in the highest possible strength/weight ratio. Suitable base materials are polyester, polyimide and ABS.

One or more cam locking units 28, which will be seen and described in more detail with reference to FIG. 2, are associated with each telescopic joint 24, 26. Each locking unit 28 has an engaged position preventing relative axial movement which would shorten the length of leg assembly 16, and a disengaged position wherein the two lower components 20, 22 of leg assemblies 16 are free to move in either axial direction. Each locking unit 28 is at least indirectly releasable by a hand-accessible element such as a lever 30 or a press-button 32.

A foldable hinged three-arm restriction member 34 is hingedly attached to the leg assemblies 16 to prevent excessive spread thereof.

Typically a tripod 10 made according to the present invention, for the purpose of supporting a 30 kg load at a height of 1.5 meters weighs no more than 3.4 kg.

With regard to the rest of the figures, similar reference numerals have been used to identify similar parts.

Referring now to FIG. 2, there is seen a cam locking unit 28 as used in the embodiment 10 shown in FIG. 1. The locking unit 28 allows extension of leg assemblies 16 while in its engaged position, and of course while in its disengaged position.

The locking force provided by the cam locking unit 28 when in its engaged position automatically increases as weight load increases on the center support 12 seen in FIG. 1. This results from the wedging geometry seen in the present figure, an increased load tending to retract the leg tube 36 serving to further wedge the cam 46 towards the tube outer face. However movement in the extension direction is free even when the cam 46 is engaged. In order to distribute wedging forces over a larger area of the tube 36, a concave shoe member 38 is advantageously interposed between the cam 46 of the locking unit 28 and the leg tube 36 with which it is in contact. The shoe member 38 prevents any possible damage to the tube 36 which might result from stress concentration imposed by the cam 46 directly. A pin 40 retains the shoe member 38 in its desired relationship to the cam 28.

The cam 46 is supported on a shaft 42, and shaped so that the distance between a part of the cam periphery and the shaft 42 exceeds the distance between the shaft 42 and the surface with which it is in contact, which in the present embodiment is a face of the shoe member 38. A spring 44 maintains the cam 46 in its engaged position. An actuation device which is hand-accessible can be pressed to overcome the torque provided by the spring 44 and so to bring the cam 46 to its disengaged position, shown in FIG. 2a. Axial movement of the tube 36 in either direction is free when the cam 46 is disengaged.

The hand-accessible element disengaging the cam locking unit 28 at the lower telescopic joint is an external lever 30, which can be made integral with the cam 46 as shown in the figure. The lever 30 is disposed on an inner face of the leg assembly 16 seen in FIG. 1 as this produces a more compact package when the tripod 10 is folded, protects the lever 30 from damage and makes possible the arrangement to be described with reference to FIG. 5.

The lowest of the three compression-resistant members 22 carries a ground contact member, such as the spike 48 shown.

The member 22 is a single tube, slightly larger in diameter than the tubes comprising the remainder of the leg assembly 16. The upper extremity of member 22 carries a guide plate 58 which is in sliding contact with two tubes of the middle compression-resistant member 20.

FIG. 3 illustrates part of an embodiment of a tripod 50 wherein actuation of the lever 30 for disengaging a cam locking unit 28 at the lower telescopic joint 26 is connected to a linkage. Linkage comprises a pair of steel wires 52 inside a tube, the wires being arranged to simultaneously disengage two cam locking units 54 controlling the upper telescopic joint 24.

The hand-accessible element releasing a cam locking unit at the upper telescopic joint is a press button 32 controlling two cam locking units 54. Depression of the press-button 32 disengages two upper locking units 54, but has no effect on the lower unit 28, as such movement merely reduces the tension on the steel wires 52. However, as explained, pressure on the lever 30 disengaging the lower units 28 also disengages the upper units 54, as the press button 32 is pulled down causing the right locking unit 54 to turn anti-clockwise and the left unit 54 clockwise.

Referring now to FIG. 4, there is depicted a detail of a tripod 60 wherein the hinged three-arm restriction member 62, is when folded, is positioned to press against all three levers 30, only one of which is shown. Folding is most conveniently done when the tripod 60 is positioned upside down, as shown in the diagram, the two ground-contact spikes 48 being uppermost. The restriction arm end links 64 disengage cam locking units 28 on all legs at the lower telescopic joints 26. As the lower locking units 28 also release the upper locking units 54, as seen in the embodiment of FIG. 3, both telescopic joints 24, 26 on all legs are disengaged. Consequently the tripod 60 can be folded and retracted with little effort in a few seconds, as there is no need for separate manual release of any of the locking devices.

FIG. 5 shows a detail of a hinged three-arm restriction member 74. The arms 66 of the foldable hinged three-arm restriction member 74 are telescopically extendible, extension/retraction of each arm 66 through a telescopic joint 68 being controlled by a further cam locking unit 70. The arms 66 are connected to hinges 76 on a common center element 80. The locking units 70 are similar to units 28, and are arranged in a manner preventing extension but allowing free retraction even when in the engaged mode. In the disengaged mode the arms 66 can be extended for the purpose of allowing more spread between legs. Leg spread can be reduced without need for any attention by the user to the locking units 70.

However, safety is assured as inadvertent spread increase can not occur, this being prevented by the automatic engagement of the lock units 70 with the extension arm tubes 72.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within The meaning and range of equivalency of the claims are therefore intended to be embraced therein.

What is claimed is:

1. A fast-deployable light weigh tripod, comprising
 a) a center support for supporting a load, provided with three peripheral hinge members;
 b) at least three multi-stage telescoping leg assemblies each attached to one of said hinge members, wherein each leg assembly comprises a first compression-resistant member, a second compression-resistant member, and third compression-resistant member, wherein said first and second compression-resistant members are interconnected by an upper telescopic joint, and said second and third compression-resistant member are interconnected by a lower telescopic joint wherein each leg assembly comprises:
 c) a first cam locking unit associated with said upper telescopic joint and a second cam locking unit associated with said lower telescopic joint, wherein when said first and second cam locking units are engaged, said leg assembly is extendable but is not retractable, and when said first and second cam locking units are disengaged, said leg assembly is both extendable and retractable, wherein said first and second cam locking units are urged towards their engaged position for automatic locking of said tripod in its deployed position;
 d) a hand accessible release element arranged to disengage said second cam locking unit, wherein said hand accessible release element is connected to a linkage, and said linkage is arranged to disengage said first cam locking unit when said hand accessible release element disengages said second cam locking unit; and
 e) a first shoe positioned between said first cam locking unit and said leg assembly, and a second shoe positioned between said second cam locking unit and said leg assembly, wherein said first and second shoes are adapted to reduce an amount of stress applied to said leg assembly by said first and second cam locking units, respectively.

2. A tripod according to claim 1, further comprising a foldable hinged three-arm restriction member hingedly attached to said legs to prevent excessive spread of said leg assemblies.

3. A tripod according to claim 1, wherein the locking force provided by said first and second cam locking units when in its engaged position automatically increases as weight load increases on said center support.

4. A tripod according to claim 1, wherein said further hand-accessible release element is a press button.

5. A tripod according to claim 1, wherein said hand-accessible release element is an external lever disposed on an inner face of said lower telescopic joint.

6. A tripod according to claim 5, further comprising a foldable hinged three-arm restriction member hingedly attached to said legs to prevent excessive spread of said leg assemblies, wherein said hinged three-arm restriction member, is when folded, positioned to substantially, simultaneously press against each of the release levers associated with each of said legs, thus disengaging cam locking units on all legs at both telescopic joints, whereby the tripod can be folded and retracted without the need for separate manual release of any of said locking devices.

7. A tripod according to claim 2, wherein the arms of said foldable hinged three-arm restriction member are telescopically extendible, operation of each restriction member elescopic joint being controlled by a further cam locking unit.

8. A tripod according to claim 1, wherein said first and second cam locking units are provided with spring means urging each of said units towards its engaged position.

9. A tripod according to claim 1, wherein each compression-resistant member comprises at least one plastic, fiber-reinforced tube.

10. A tripod according to claim 9, wherein said fiber-reinforced tube is reinforced with carbon fibers.

11. A tripod according to claim 1, able to support a 30 kg load at a height of 1.5 meters and weighing no more than 3.4 kg.

* * * * *